United States Patent
Zhang et al.

(10) Patent No.: US 8,605,890 B2
(45) Date of Patent: Dec. 10, 2013

(54) MULTICHANNEL ACOUSTIC ECHO CANCELLATION

(75) Inventors: Zhengyou Zhang, Bellevue, WA (US); Qin Cai, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 951 days.

(21) Appl. No.: 12/235,104

(22) Filed: Sep. 22, 2008

(65) Prior Publication Data

US 2010/0074433 A1   Mar. 25, 2010

(51) Int. Cl.
  *H04M 9/08* (2006.01)
(52) U.S. Cl.
  USPC .................................... 379/406.08
(58) Field of Classification Search
  USPC .................................... 379/406.08
  See application file for complete search history.

(56) References Cited

U.S. PATENT DOCUMENTS

| | | | | |
|---|---|---|---|---|
| 4,677,668 | A * | 6/1987 | Ardalan et al. | 379/406.05 |
| 5,555,310 | A * | 9/1996 | Minami et al. | 381/17 |
| 5,859,907 | A * | 1/1999 | Kawahara et al. | 379/406.08 |
| 5,995,620 | A | 11/1999 | Wigren | |
| 6,246,760 | B1 * | 6/2001 | Makino et al. | 379/406.08 |
| 7,020,279 | B2 | 3/2006 | Usman et al. | |
| 7,043,013 | B2 | 5/2006 | Le Tourneur et al. | |
| 7,058,185 | B1 | 6/2006 | Egelmeers et al. | |
| 7,142,665 | B2 | 11/2006 | Barron et al. | |
| 7,190,775 | B2 | 3/2007 | Rambo | |
| 2006/0002547 | A1 * | 1/2006 | Stokes et al. | 379/406.14 |
| 2006/0147063 | A1 | 7/2006 | Chen | |
| 2007/0280472 | A1 | 12/2007 | Stokes, III et al. | |
| 2008/0118075 | A1 | 5/2008 | Benesty et al. | |

OTHER PUBLICATIONS

Lee, et al., "Teleconferencing System with Multi Spatial Region Acoustic Echo Cancellation", Retrieved at<< http://www.kecl.ntt.co.jp/icl/signal/iwaenc03/cdrom/data/0022.pdf>>, International Workshop on Acoustic Echo and Noise Control (IWAENC2003), Sep. 2003, Kyoto, Japan, pp. 51-54.

Sondhi, et al., "Stereophonic Acoustic Echo Cancellation—An Overview of the Fundamental Problem", Retrieved at<< http://ieeexplore.ieee.org/iel4/97/9090/00404129.pdf >>, IEEE Signal Processing Leiters, vol. 2, No. 8, Aug. 1995, pp. 148-151.

"A Highly Adaptive Acoustic Echo Cancellation Solution for VoIP Conferencing Systems", Umar Iqbal Choudhry, Jongwon Kim and Hong Kook Kim, Mar. 8, 2006, IEEE International Conference on Computer Systems and Applications, reprinted from the Internet at: http://icserv.kjist.ac.kr/mis/publications/data/2006/2006-AICCSA-Umar_1.pdf, pp. 433-436.

"An Acoustic Echo Cancellation Structure for Synthetic Surround Sound", Trevor Yensen and Refik Goubran, 2001, icassp. IEEE International Conference on Acoustics, Speech, and Signal Processing, vol. 5, pp. 3237-3240.

* cited by examiner

*Primary Examiner* — Alexander Jamal
(74) *Attorney, Agent, or Firm* — Microsoft Corporation (57) ABSTRACT

A multi-party spatial audio conferencing system is configured to receive far end signals from remote participants. The system comprises a speaker array that outputs spatialized sound signals and one or more microphones that capture and relay a sound signal comprising an echo of the spatialized sound signal to a multichannel acoustic echo cancellation (MC-AEC) unit having a plurality of echo cancellers. Respective echo cancellers perform cancellation of an echo associated with a far end signal from one of the multiple participants according to an algorithm based upon echo cancellation coefficients. The echo cancellation coefficients are determined from the input channel signals, the spatialization parameters associated with each input channel, and the audio signals captured by the microphones. This allows respective echo cancellation filters to be updated simultaneously even though the corresponding remote participant is not talking.

20 Claims, 8 Drawing Sheets

MULTICHANNEL ACOUSTIC ECHO CANCELLATION

BACKGROUND

In recent history, technology has allowed the world to become increasingly integrated and globalized. Many companies are now global entities, comprising offices and manufacturing sites geographically dispersed throughout the world. People also are more likely than ever to change their residence multiple times during their lives. With such an integrated, yet geographically diverse world, people often need to communicate with others who are far away. In order to facilitate this communication, teleconferencing and video conferencing are commonplace. Teleconferencing connects two or more participants over a network. The participants often rely upon a conferencing system that may include a microphone and a speaker. Video conferencing further includes a camera and a video monitor allowing the participants to converse while viewing video images of each other.

Teleconferencing and video conferencing systems both commonly suffer from the problem of acoustic echo, which is a delayed and distorted version of an original sound reflected back to its source. Traditionally, a system prone to acoustic echo problems includes a speaker/microphone pair on both ends (called the near-end and the far-end) of the connection. When near-end participants talk, their voices are picked up by the near-end microphone, transmitted to the far-end, and presented as a sound signal via the far-end speaker. However, the far-end microphone will also pick up this sound signal, directly or indirectly, and the far-end system will send it back to the near-end. This causes the near-end participants to hear a delayed and distorted version of their own speech, which decreases the perceived audio quality.

Acoustic echo cancellation (AEC) systems are part of practically all speakerphone (e.g., teleconferencing and/or videoconferencing) communication systems. In recent years, increased use of teleconferencing and videoconferencing have produced a high demand for improved sound quality of audio conferencing systems. This high demand continually drives improvement of acoustic echo cancellation systems.

Although the problem of echo reduction has been described in the context of teleconferencing and video conferencing, it will be appreciated that it can also occur whenever a speaker and microphone are configured to be in a closed loop.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, audio signals captured by one or more microphones comprised within an audio conferencing system are adjusted to provide an improvement in acoustic echo cancellation (AEC). More particularly, a multi-party spatial audio conferencing system (e.g., a conferencing system that gives a listener the impression that remote participants are dispersed throughout a three dimensional virtual environment) comprises a speaker array configured to output spatialized audio signals and one or more microphones configured to capture and relay a sound signal comprising an echo of the spatialized audio signal to a multi channel acoustic echo cancellation (MC-AEC) unit having a plurality of echo cancellers. Respective echo cancellers perform cancellation of an echo associated with a far end signal from one of the multiple participants according to an algorithm based upon spatialization parameters associated with respective input channels. The output of the MC-AEC unit is an audio signal having an improved sound quality (e.g., reduced echo, higher echo return loss enhancement (ERLE)).

Essentially, far end signals from remote participants are received (e.g., by a conferencing system) over multiple input channels. The far end signals are spatialized (e.g., processed to give a listener the impression that a sound source is within a three-dimensional environment) by outputting respective far end signals from a plurality of speakers, wherein different gain and delay modulations are applied to the far end signal output from different speakers resulting in different remote participants having different virtual locations. Output spatialized audio signals undergo changes resulting in a sound signal comprising an echo having a mixture of far end signals. The sound signal is captured by a microphone and conveyed to an MC-AEC unit comprising a plurality of echo cancellers. Respective echo cancellers remove an echo substantially equal to the product of an echo cancellation coefficient and a far end signal of one of the multiple input channels. The product of the echo cancellation coefficient and a respective far end signal is substantially equal to the echo captured by the microphone for the far end (e.g., the product of the echo cancellation coefficient and the far end signal is equal to the contribution of that far end signal to the echo captured by the microphones. The echo cancellation coefficients are determined by summing over a product of a room impulse response (RIR) model of the convolution of the far end signal and spatialization parameters.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Audio conferencing systems which simultaneously present multiple voices through a single channel can result in audio voice output which is difficult to comprehend, thereby causing conference participants to often have difficulty identifying the voices of remote (e.g., far end) participants, especially in groups having unfamiliar members. Therefore, more recent teleconferencing systems have begun to perform audio spatialization (e.g., mapping the voices of far end participants over a virtual 3-dimensional environment) to make it appear as though remote participant voices are coming from different locations. This enhances the collaborative experience during multi-party conferencing by allowing improved distinction between remote voices. Unfortunately, stereo acoustic echo cancellation (AEC) suffers from, among other things, a misconvergence problem when applied to a spatialized conferencing system because of cross-correlation between the loudspeakers' signals. If the loudspeakers' signals are used as reference signals for AEC, there are many solutions and the echo canceller may converge to any of the solutions which does not correspond to the true echo path. This misconvergence problem reduces audio quality, thereby making it difficult to distinguish the location of a sound and making it difficult to distinguish between far end voices. Accordingly, there is room for improvement with regard to acoustic echo cancellation for spatialized multi-party conferencing systems.

As provided herein, a system and technique are set forth for improved multichannel acoustic echo cancellation (MC-AEC) of a spatialized audio signal (e.g., comprising an echo of a speakerphone output) captured by one or more microphones. The system comprises a multichannel acoustic echo cancellation (MC-AEC) unit (e.g., AEC filter) having a plurality of echo cancellers configured to execute an algorithm upon the captured sound signal which respectively removes echo corresponding to an associated far end channel. More particularly, respective echo cancellers subtract out the product of an echo cancellation coefficient and an associated far end input signal (e.g., from a remote participant). The product of the echo cancellation coefficient and the associated far end input signal is substantially equal to the contribution of the far end input signal to the echo captured by the microphone. The echo cancellation coefficient is determined at a specific time for respective far end signals by summing over the product of spatialization parameters (e.g., gain and delay modulations) and a model of the room impulse response (RIR) of a respective far end signal resulting in an interdependence between echo cancellers.

Figure 1:
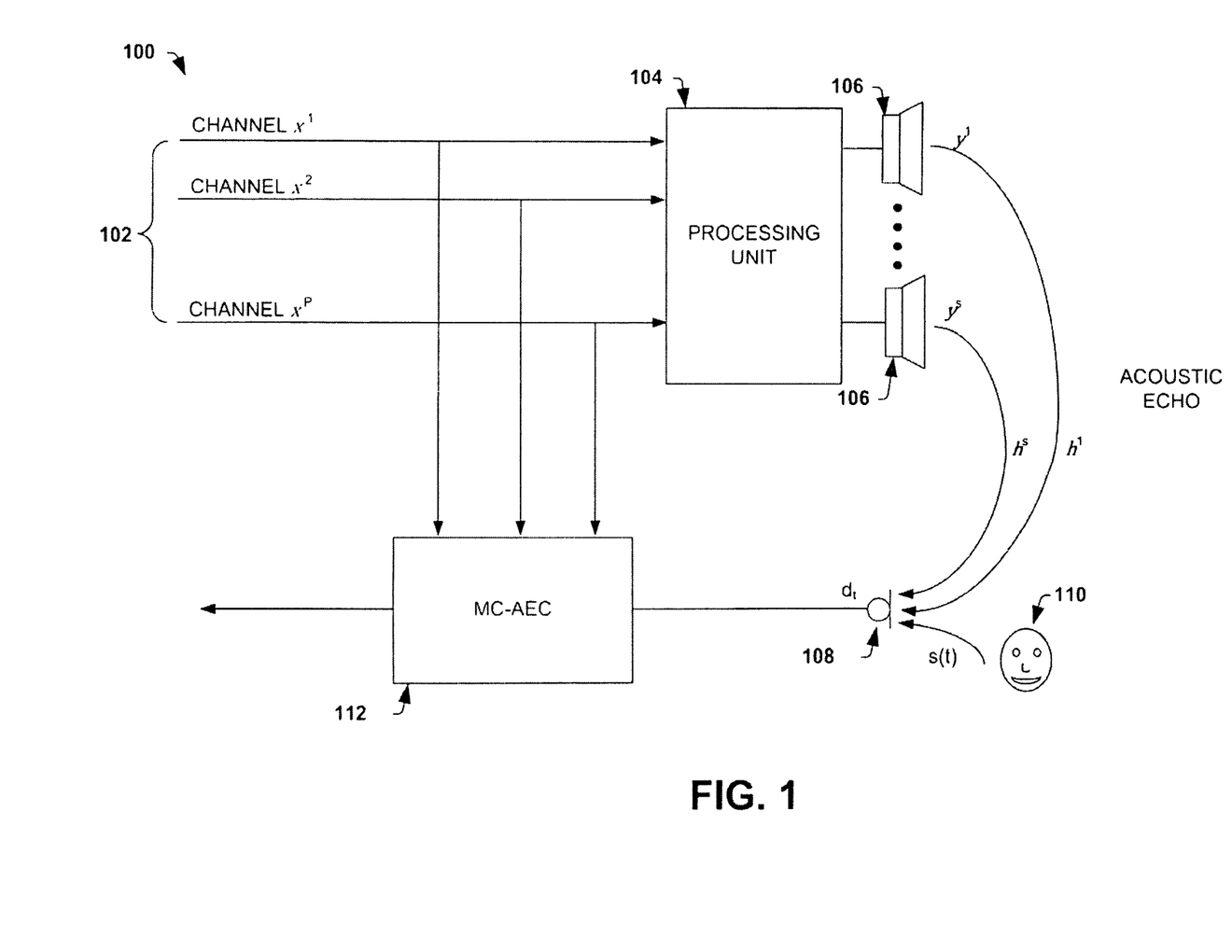
FIG. 1 illustrates a block diagram of a typical multi-party stereo conferencing system with Multichannel Acoustic Echo Cancellation (MC-AEC) as provided herein.

FIG. 1 illustrates a block diagram of a typical multi-party stereo conferencing system with Multichannel Acoustic Echo Cancellation (MC-AEC) 100 as provided herein, Far end signals (e.g., $x^1, x^2, \ldots x^P$) are received into a conferencing system (e.g., through a telephone connection, internet connection, etc.) from a plurality of remote participants by way of a plurality of input channels 102. In one example, respective input channels carry far end signals from different remote participants (e.g., channel $x^1$ carries the voice of far end participant 1, channel $x^2$ carries the voice of far end participant 2, channel $x^P$ carries the voice of far end participant P).

A dynamic processing unit 104 spatializes the far end signals prior to being output by a speaker array comprising a plurality of speakers 106. Spatialization is the mixing of far end signals from different channels such that the voice of remote (e.g., far end) participants appear to be output from different virtual locations (e.g., audio signals are processed to give a listener the impression that a sound source is within a three-dimensional environment). For example, if there are three remote participants, spatialization will output the voice of respective participants from different virtual locations as shown in FIGS. 2A-2C.

Figure 2A:
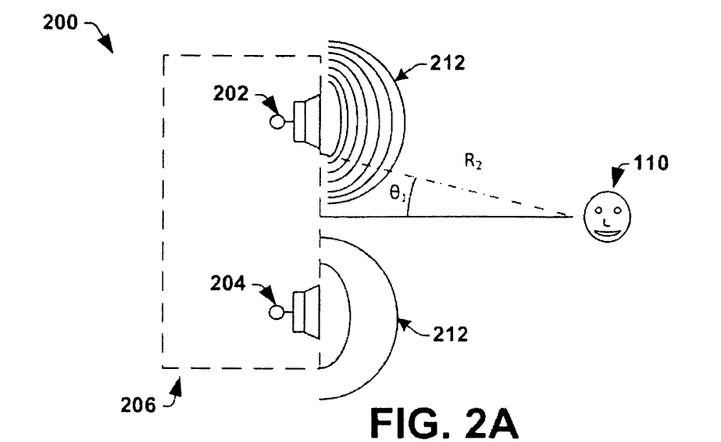
FIG. 2 illustrates an example of spatialization in a two speaker stereo conferencing system.
Figure 2B:
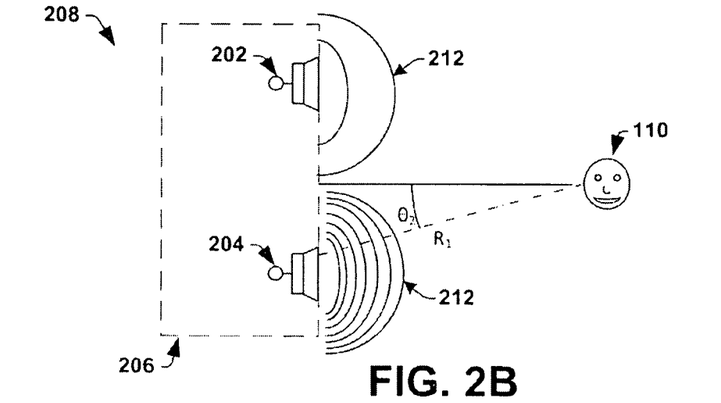
Figure 2C:
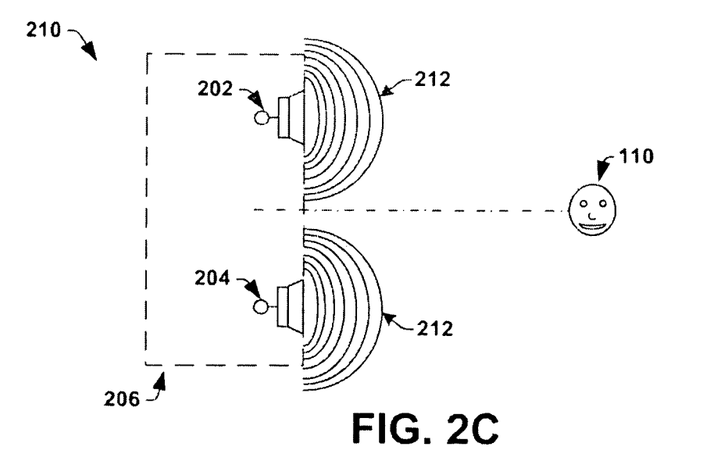

FIGS. 2A-2C illustrate a spatialized audio conferencing system 206 having a two speaker stereo output. The sound level (e.g., volume) output by a speaker is illustrated by the distance between sound wave lines 212. For example, in FIG. 2A, the top speaker 202 outputs a higher sound level (e.g., louder volume) than the bottom speaker 204 as illustrated by a smaller distance between output sound wave lines. Therefore, in FIG. 2A, a first participant's audio signal is predominately output from a first speaker 202 making it appear as through the first participant's voice is coming from an angle $\theta_1$ (e.g., $\theta_1=+35°$) and a distance $R_1$ relative to a listener/user 110. In FIG. 2B, a second participant's audio signal is predominately output from a second speaker 204 therefore making it appear as through the second participant's voice is coming from an angle $\theta_2$ (e.g., $\theta_2=-35°$) and a distance $R_1$ relative to the system user 110. In FIG. 2C, a third participant's audio signal is equally output between the first speaker 202 and the second speaker 204, therefore making it appear as through the third participant's voice is coming from between the first speaker 202 and the second speaker 204. By utilizing different gain and delay modulations, the location (e.g., the virtual angle $\theta_x$, where x=remote participant, and virtual distance $R_x$) of additional voices can be varied accordingly.

Referring again to FIG. 1, the plurality of speakers 106 output spatialized far-end signals $y^1, \ldots, y^S$ (e.g., a sound from a remote participant output by a telephone associated with a conference system user). The spatialized signals $y^N$, (N=1−S) will disperse through a room comprising the plurality of speakers 106 and one or more microphones 108 (e.g., a speakerphone system) that may be undergoing changes $h^1, \ldots, h^S$ (e.g., a convolution). The one or more microphones 108 capture the sound signals originating from far end participants (e.g., emanating from the speakers 106) potentially giving rise to acoustic echo. The one or more microphones 108 may additionally capture a near end voice (e.g., from the conference system user) if the conferencing system user 110 is speaking.

A multichannel acoustic echo cancellation (MC-AEC) unit 112 receives the captured sound signal from the one or more microphones 108. The MC-AEC unit 112 generally comprises a linear adaptive filter configured to perform acoustic echo cancellation (AEC) on captured sound signals according to an algorithm as provided herein (e.g., see FIG. 5). The MC-AEC unit reduces the echo by an amount substantially equal to the echo captured by the microphone 108. The MC-AEC unit simulates (e.g., models) the echo captured by the one or more microphones 108 by taking the product of an echo cancellation coefficient and an associated far end signal. The echo cancellation coefficient is a numerical value comprised within a vector that generally relates a received input signal from a channel to the amount of echo resulting from that channel received by the one or more microphones 108 (e.g., an echo cancellation coefficient with larger values generally corresponds to a channel which produces a larger echo compared with an echo cancellation coefficient having a smaller value). The echo cancellation coefficient is dependent upon the gain and delay modulations used to spatialize the far end input signal and a model of the room impulse response (RIR) $H^1, \ldots, H^S$ of a respective far end signal, wherein the room impulse response (RIR) (e.g., a program that calculates room impulse response $H^S$) can be modeled by a finite impulse response (FIR) filter with L taps in the frequency domain.

In one particular embodiment, an additional dynamic processor (not shown) is configured to convert captured sound signals from the time domain (denoted in this disclosure as lower case letters) to the frequency domain (denoted in this disclosure as upper case letters) prior to performing acoustic echo cancellation. Conversion to the frequency domain allows the echo cancellation to be performed in the frequency domain which decreases the computation time for MC-AEC.

The MC-AEC system 100 of FIG. 1 can be incorporated into a wide variety of electronic devices to provide improved echo reduction. For example, a cellular phone comprising a transmission device configured to facilitate communication with other remote participants could incorporate the MC-AEC system 100 of FIG. 1 for improved echo reduction while operating in a speakerphone mode. In particular, in 3G cellular phones video capabilities will increase, resulting in wider use of speakerphones. In such 3G cellular phones the need for AEC will increase. Similarly, a video conferencing system comprising a visual display unit and a visual recording device could comprise the MC-AEC system 100 of FIG. 1 thereby providing a video conferencing system that offers increased echo return loss enhancement (ERLE). It will be appreciated that the inventors have contemplated use of the MC-AEC system 100 of FIG. 1 for use in a wide variety of applications.

Figure 3:
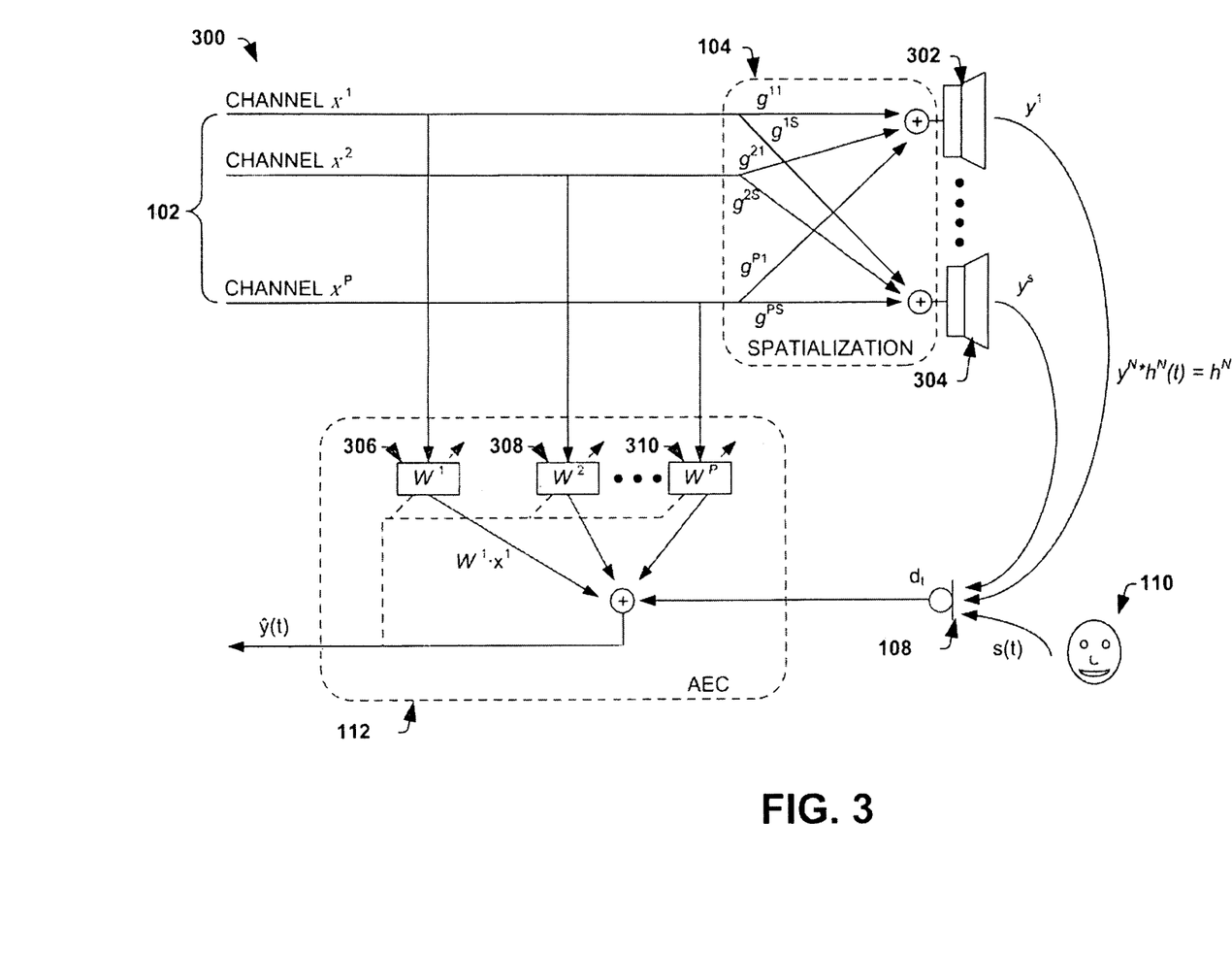
FIG. 3 illustrates a more detailed example of a block diagram of a typical multi-party stereo conferencing system with Multichannel Acoustic Echo Cancellation (MC-AEC) as provided herein.

FIG. 3 illustrates a more detailed block diagram of a typical stereo conferencing system with Multichannel Acoustic Echo Cancellation (MC-AEC) 300. Far end signals (e.g., audio information) are received by the system from P remote (e.g., far end) participants by way of a plurality of channels 102. The received audio signals are spatialized by a dynamic processing unit 104. Spatialization is performed by applying different gain and delay modulations (e.g., $g^{11}, g^{22}, g^{12}$, etc.) to a given far end signal. For example, as shown in FIG. 3 the far end signal of channel $x^1$ is output to a plurality of speakers. A gain and delay modulation $g^{11}$ is applied to the far end signal sent from channel $x^1$ to a first speaker 302 and a gain and delay modulation $g^{1S}$ is applied to the far end signal sent from channel $x^1$ to a second speaker 304. Similarly, the far end signal of channel 2 is output to speakers 302 and 304, wherein a gain and delay modulation of $g^{21}$ is applied to the far end signal sent from channel $x^2$ to speaker 302 and a gain and delay modulation $g^{2S}$ is applied to the far end signal sent from channel $x^2$ to speaker 304. The different gain and delay modulations are used to create the effect that far end signals from different channels are coming from different locations as shown in FIGS. 2A-2C. In general, the number of speakers S is usually equal to or smaller than the number of input channels P (e.g., three people call an audio conferencing system comprising two speakers (P=3 and S=2)).

Cumulatively, the speakers output spatialized sound signals $y^1, \ldots, y^s$ comprising far end signals of multiple channels (e.g., $x^1, \ldots, x^P$). After sound signals are output they undergo changes (e.g., attenuation, reflection, reverberation) which are described by the convolution of the far end signal $y(t)$ and a room impulse response (RIR) term $h^N(t)$ (e.g., $y^N * h^N(t)$, in time, which is approximated by the product $Y(f)H(f)$ in frequency). The room impulse response describes how a far end signal $y^N$ changes after it leaves the plurality of speakers 106. The changes in the spatialized audio signals $h^1, \ldots, h^s$ result in sound signals comprising an echo which has a mixture of far end signals from a plurality of channels.

One or more microphones 108 capture the signal $d_t$ (e.g., the microphone input), comprising the convolution of the spatialized audio signal (e.g., $y^1, \ldots, y^s$) and the room impulse response term $h^N(t)$, at a given time instant t. The received sound signal $d_t$ is communicated to a MC-AEC 112. As illustrated in FIG. 3, the MC-AEC unit 112 comprises a plurality of echo cancellers (306, 308, 310). Respective echo cancellers (e.g., 306, 308, or 310) store an echo cancellation coefficient $W^N$ and are configured to receive a far end signal from a single channel $x^N$ (e.g., echo canceller 306 stores echo cancellation coefficient $W^1$ and receives input from channel $x^1$). At the specific time instant t, the echo cancellation coefficient is substantially equal to a sum over all speakers of a product of the modeled RIR (e.g., of a spatialized far end signal) and the gain and delay modulations used to spatialize the far end signal $$\left( e.g., W_t^i = \sum_{s=1}^{S} G^{iS} H_t^s \right).$$

The echo cancellers multiple their respective echo cancellation coefficient by an associated far end signal (e.g., $W^N \cdot X^N$, where N=1, . . . , P). The product of the echo cancellation coefficient and the far end signal is substantially equal to a subset of the received signal corresponding to the echo from that input channel. For respective channels an echo canceller then subtracts the product of the echo cancellation coefficient and the far end signal from the received sound signal $d_t$ resulting in a received signal with reduced echo (e.g., combination of the echo cancellation coefficients W and far end signals cancel out the microphone input $d_t$). The resultant signal output from the MC-AEC is equal (in the frequency domain) to the captured signal $D_t$ minus the echo subtracted by the P echo cancellers:

$$D_t - \sum_{i=1}^{P} W_t^{iT} X_t^i$$

where $W_t^i$ is a matrix comprising echo cancellation coefficients, $X_t^i$ is a matrix comprising far end signals, t is the time instant (or frame number), and T is the transpose of the matrix $W_t^i$.

The MC-AEC system 300 illustrated in FIG. 3 has a number of advantages over prior art acoustic echo cancellation systems. For example, due to the interdependence of echo cancellation coefficients even echo cancellers that are not in use are constantly updated. The MC-AEC system and algorithm provided herein, for example, adapt the per channel impulse response (CIR) and also resolve the RIR between loudspeakers and the one or more microphones 108. Therefore, as long as one channel is active, the RIRs and CIRs for other input channels are adapted simultaneously. For example, if a remote participant is silent for long periods of time, the adaptation from other channels will benefit adaptation for that silent channel resulting in a reduced echo when the participant resumes talking.

Figure 4:
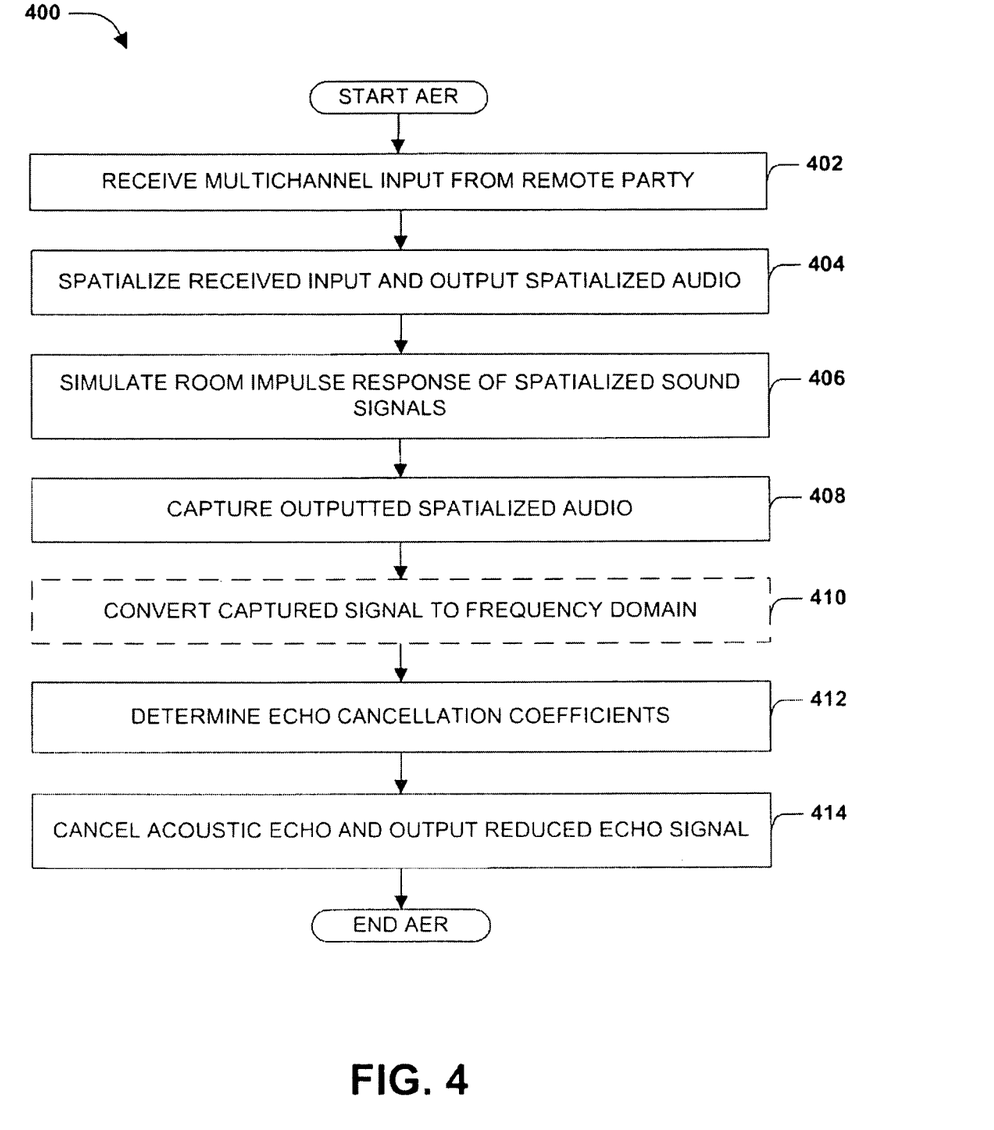
FIG. 4 is a flow chart illustrating an exemplary method of classifying residual output of a Multichannel Acoustic Echo Cancellation unit as either predominantly residual echo or near-end signal.

FIG. 4 is a flow diagram illustrating an example a method of multichannel acoustic echo cancellation (MC-AEC). More particularly, FIG. 4 illustrates a method of MC-AEC that utilizes echo cancellation coefficients that provide an interdependence between multiple far end input channels. It will be appreciated that the following acts are performed for a specific time instant (or frame number). Over the course of a teleconference, for example, this method will be repeated for a plurality of time instants.

At 402 a multichannel far end input is received from a plurality of remote participants by way of a plurality of input channels.

The received audio signals are spatialized and output from a plurality of speakers (e.g., two or more speakers) at 404. In general, for a teleconferencing system comprising S speakers and P channels, the output of respective speakers is equal to (in the frequency domain) the sum of the product of the gain and delay modulation $G^{is}$ and the channel signal $X^1$ over all channels P.

$$Y^S = \sum_{i=1}^{P} G^{is} X^i$$

where summation over all channels results in spatialization, as illustrated in FIG. 3 (e.g., the output of $y^1 = g^{1i}*x^1 + g^{21}*x^2 + \ldots g^{P1}*x^P$ is spatialized where * represents convolution). After the sound is output from the loudspeaker it will undergo changes as it propagates through time and reflects off of objects. The changes are described by the convolution of the far end signal y(t) and a room impulse response (RIR) term h(t). The interdependence of speaker output onto a number of channels creates a complicated echo that is difficult to reduce in downstream processing.

At 406 the room impulse response of spatialized sound signals are simulated (e.g., modeled). Simulation of the RIR obtains RIR terms H(t), for respective time instances and channels, which are equal to the actual convolution of spatialized audio signals output by the plurality of speakers. The room impulse response (RIR) is simulated, for example, using a FIR filter with L tapes. The simulation results can be used to determined the echo cancellation coefficients.

At 408 the near-end signal and a convolution of the far end signal are captured by a microphone. In alternative embodiments, a plurality of microphones arranged in varying geometric layouts may also capture the far end signal. In general the microphone will capture a sound signal that can be described as the sum of the output of the speakers (e.g., the sum of the product of the gain and delay modulation and the channel signal over all channels) and a convolution term which describes how the spatialized signal propagates after being output from the microphone. Mathematically this can be written as:

$$D_t = \sum_{i=1}^{P} \sum_{s=1}^{S} G^{is} H_t^{s^T} X_t^i$$

where $H_t^{s^T}$ is a transpose of the convolution term at a time t.

The captured sound signals (e.g., the near-end and convolution of the far end signal) are optionally converted from the time domain (denoted as lower case characters) to the frequency domain (denoted as upper case characters) at 410 to facilitate faster processing. Conversion to the frequency domain can be performed using a Discrete Fourier Transform (DFT), or a Fast Fourier Transform (FFT), or Modulated Complex Lapped Transformation (MCLT), for example. Respective audio frames (frames) are converted to the frequency domain and presented as a vector of complex numbers.

At 412 one or more echo cancellation coefficients are determined. The echo cancellation coefficients are determined in such a manner that there is an interdependence between echo cancellation coefficient used by different echo cancellers. The echo cancellation coefficients are determined, for example, by solving a statistical parameter estimation method (e.g., a constrained Kalman filter problem), wherein available constraints among the parameters are imposed automatically. In one example, the constraint is determined by applying echo cancellation to the system at a time when the only sound being received by the microphone is echo (e.g., therefore echo cancellation removes all sound). Mathematically this constraint can be written as:

$$D_t - \sum_{i=1}^{P} w_t^{i^P} X_t^i = 0$$

where $D_t$ is the received signal for the $t^{th}$ time instant, $W_t^i$ is the echo cancellation coefficient for the $t^{th}$ time instant and $X_t^i$ is the input audio signal for the $t^{th}$ time instant.

At 414 the acoustic echo is cancelled. The echo cancellation coefficient determined in 410 is utilized by respective echo cancellers to remove echo from the captured signal. Respective echo cancellers will input the product of their associated echo cancellation coefficient and input channel signal to the MC-AEC unit. The MC-AEC unit will receive the captured signal from the one or more microphones and subtract input of respective echo cancellers $$\left(e.g., D_t - \sum_{i=1}^{P} W_t^{i^T} X_t^i\right).$$

The result of the echo cancellation is an improve quality audio signal with reduced echo being output from the audio conferencing system.

Figure 5:
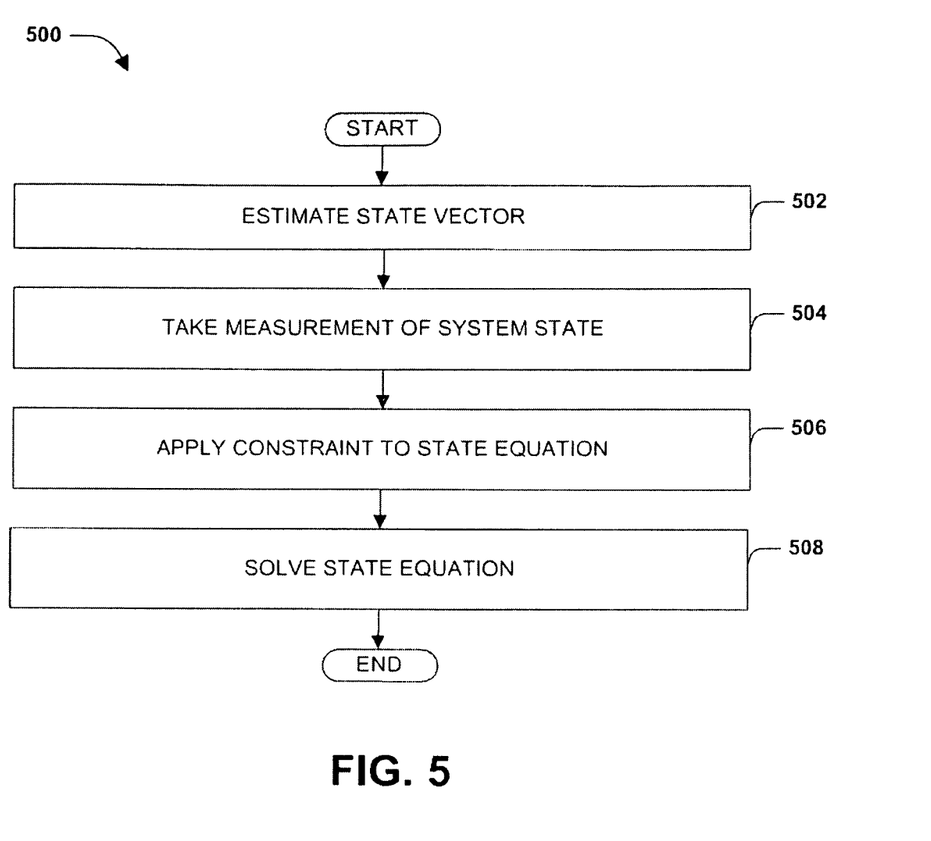
FIG. 5 is a flow chart illustrating an exemplary method of classifying residual output of a Multichannel Acoustic Echo Cancellation unit as either predominantly residual echo or near-end signal.

FIG. 5 is a flow chart illustrating an in depth example of a method to determine echo cancellation coefficients. More particularly, method 400 illustrates a constrained Kalman filtering (CKF) using a far end signal from an input channel to determine the echo cancellation coefficient. The CKF of method 500 relies upon a recursive estimation method. A prediction phase estimates the state from previous time instants to produce an estimate of the state at the current time. Measurement information is then taken at the current time instant and is used to refine the prediction to arrive at a more accurate state estimate. The process then starts over using the more accurate state estimate as a prediction for the next time instant. The CKF provides an estimate of the echo cancellation coefficient based upon defined parameter constraints (e.g., See element 410 in FIG. 4) resulting in an improved captured sound quality.

At 502 a state vector is estimated for the MC-AEC system. The state vector is a vector comprising variables which can be used to mathematically describe the state of the system (e.g., the state vector comprises variables on which calculations can be performed to determine attributes of the system). For example, the state vector can comprise the echo cancellation coefficient W and the modeled room impulse response H. This results in a (P+S)L dimensional vector $S_t$ $$S_t = [W_t^{1^T}, \ldots, W_t^{P^T}, H_t^{1^T}, \ldots, H_t^{S^T}]^T$$

where echo cancellation coefficient and room impulse response sufficiently describe the system to perform acoustic echo cancellation.

At 504 a scalar measurement of the system state at a current time is taken. The scalar measurement takes into account the audio signal and noise (e.g., error) at a time instant t. The measurement can be written as:

$$D_t = A_t^T S_t + v_t$$

where $v_t$ is the observation noise (e.g., the microphone noise and the ambient noise) that can also model the inaccuracy of the observation system and $A_t$ is a vector describing the audio signal carried by the channels $$\left(\text{e.g., } A_t = \left[X_t^{1^T}, \ldots, X_t^{P^T}, 0^{1^T}, \ldots, 0^{S^T}\right]^T\right).$$

At 506 a constraint is applied to the state equation and the state equation is solved. The constraint on the state parameters can be determined, for example, by applying echo cancellation to the system at a time when the only sound being received by the microphone is echo. This constraint can be written in terms of the state equation and a matrix comprising the gain and delay modulations for spatialization: where $$CS_t = 0$$

where $$C = \begin{bmatrix} -1 & & G^{11}1 & \ldots & G^{1S}1 \\ & \ddots & \vdots & \ddots & \vdots \\ & & -1 & G^{P1}1 & \ldots & G^{PS}1 \end{bmatrix}.$$

The constraint can be considered as an observation and there can be applied to the measurement resulting in a new observation equation which can be solved using a Kalman filter technique, for example.

The state equation is solved according to the constraints at 508. The constraint depends upon a covariance matrix of the noise term. This covariance matrix can be set to different values depending on user preference. For example, the covariance matrix is set equal to zero for strict imposition of the constraint, while a softer constraint uses a non-zero covariance matrix. In practice a soft constraint is often used to provide a more stable system on account of nonlinearity in loudspeakers and clock drift between loudspeakers and sound capture. Alternatively, the covariance matrix can be varied over time (e.g., start with a large value and decrease it over time).

In an alternative embodiment the computational time of the method illustrated in FIG. 5 can be reduced by introducing sequential scalar updates. For example, the CKF can be applied sequentially to measurements $Y_t$ resulting in a measurement of $Y_{t,j}$ where j is an element of the measurement matrix (e.g., $Y_{t,j} = b_{t,j}^T S_t + v_{t,j}$ for j=1, . . . , PL+1). In such an embodiment sequential application of the CKF inhibits inversion of a large matrix thereby reducing the computational cost.

Figure 6:
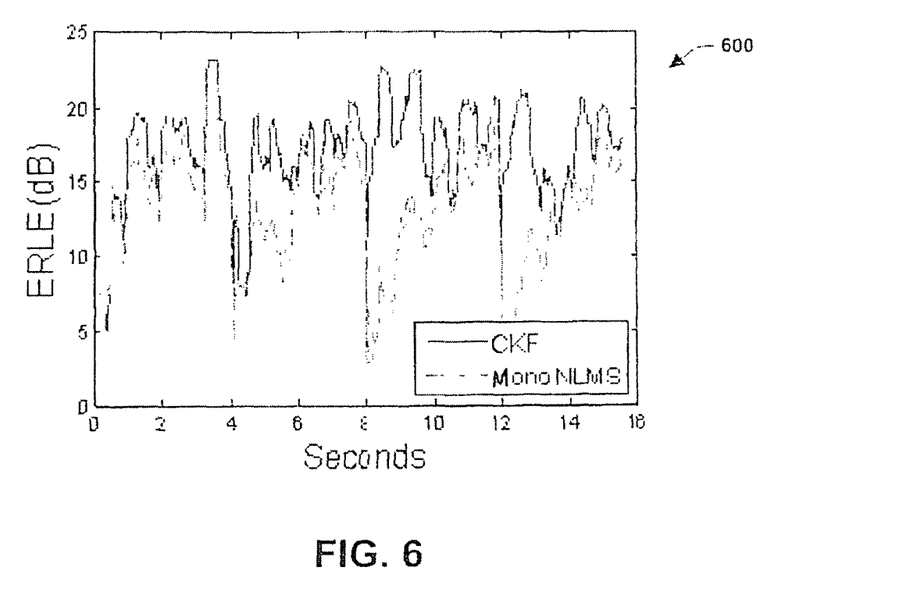
FIG. 6 illustrates experimental measurements of echo return loss enhancement (ERLE) for a multi-party stereo conferencing system with MC-AEC as provided herein and for a multi-party stereo conferencing system with AEC utilizing a four mono normalized least mean square (NLMS) algorithm.
Figure 7:
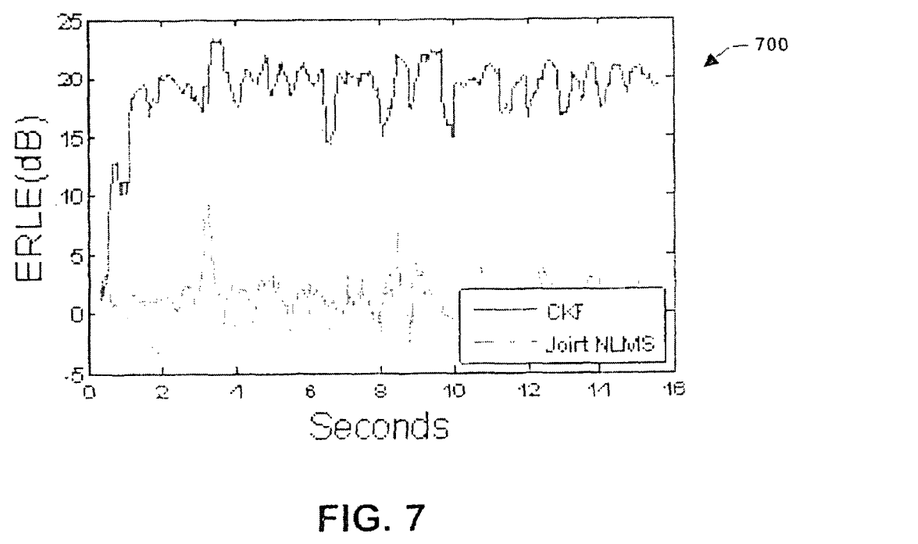
FIG. 7 illustrates experimental measurements of ERLE for a multi-party stereo conferencing system with MC-AEC as provided herein and for a multi-party stereo conferencing system with AEC utilizing a joint NLMS algorithm.

FIGS. 6-7 illustrate exemplary experimental results of an acoustic echo cancellation system implemented as provided herein. These figures illustrate an improvement in echo return loss enhancement (ERLE) for acoustic systems. For example, the graph 600 in FIG. 6 illustrates the ERLE vs. time for an acoustic system utilizing the CKF-AEC method (e.g., FIG. 5) and for an acoustic system utilizing a four mono normalized least mean square (NLMS) method. It is evident that the ERLE is higher for the CKF-AEC method thereby providing improved performance over a mono NLMS method. In FIG. 7, the graph 700 illustrates the ERLE vs. time for an acoustic system utilizing the CKF-AEC method and an acoustic system utilizing a joint NLMS method. The ERLE is higher for the CKF-AEC method than a joint NLMS method, also showing improved performance of the method provided herein over prior art acoustic echo cancellation.

Figure 8:
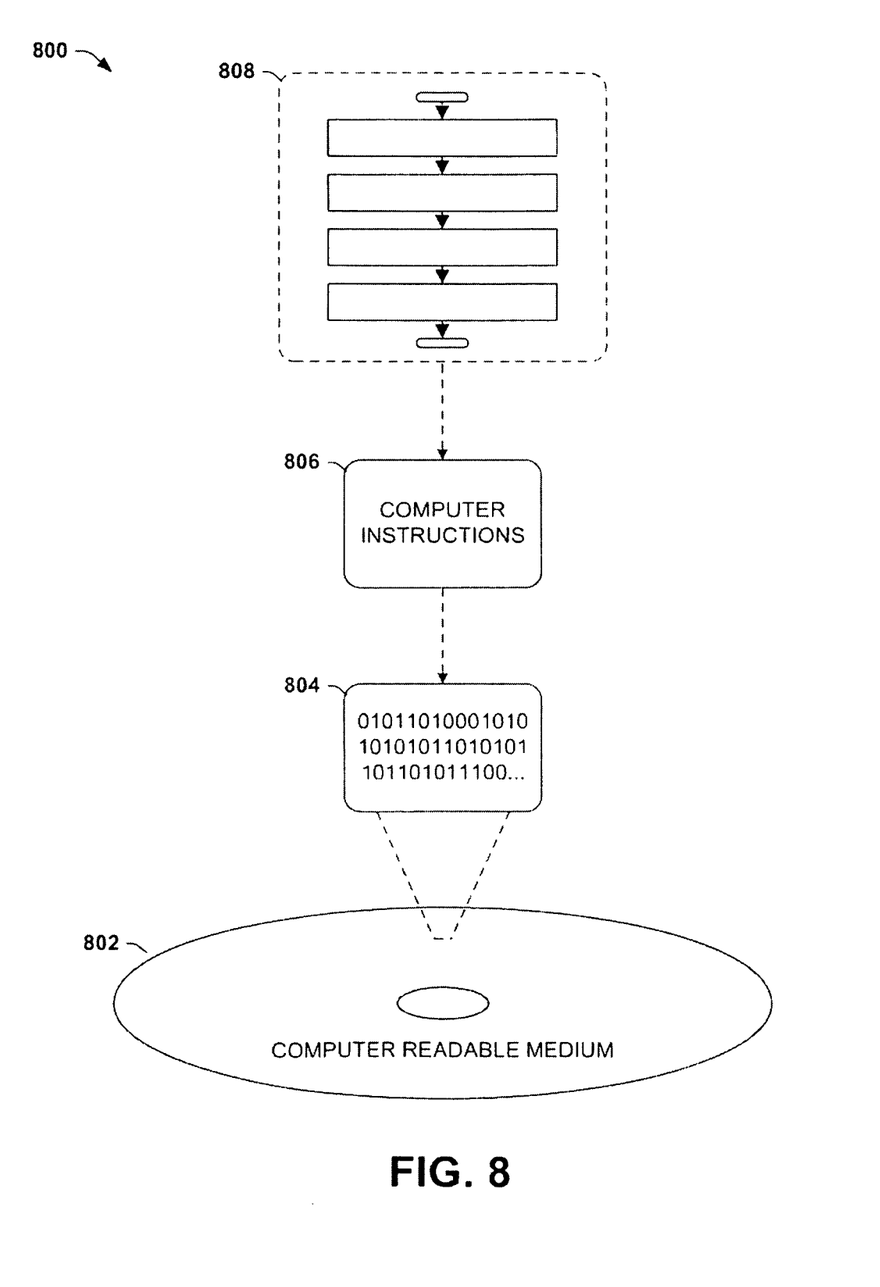
FIG. 8 is an illustration of an exemplary computer-readable medium comprising processor-executable instructions configured to embody one or more of the provisions set forth herein.

Still another embodiment involves a computer-readable medium comprising processor-executable instructions configured to apply one or more of the techniques presented herein. An exemplary computer-readable medium that may be devised in these ways is illustrated in FIG. 8, wherein the implementation 800 comprises a computer-readable medium 802 (e.g., a CD-R, DVD-R, or a platter of a hard disk drive), on which is encoded computer-readable data 804. This computer-readable data 804 in turn comprises a set of computer instructions 806 configured to operate according to one or more of the principles set forth herein. In one such embodiment, the processor-executable instructions 806 may be configured to perform a method 808, such as the exemplary method 400 of FIG. 4, for example. In another such embodiment, the processor-executable instructions 806 may be configured to implement a system configured to improve the suppression of residual echo. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
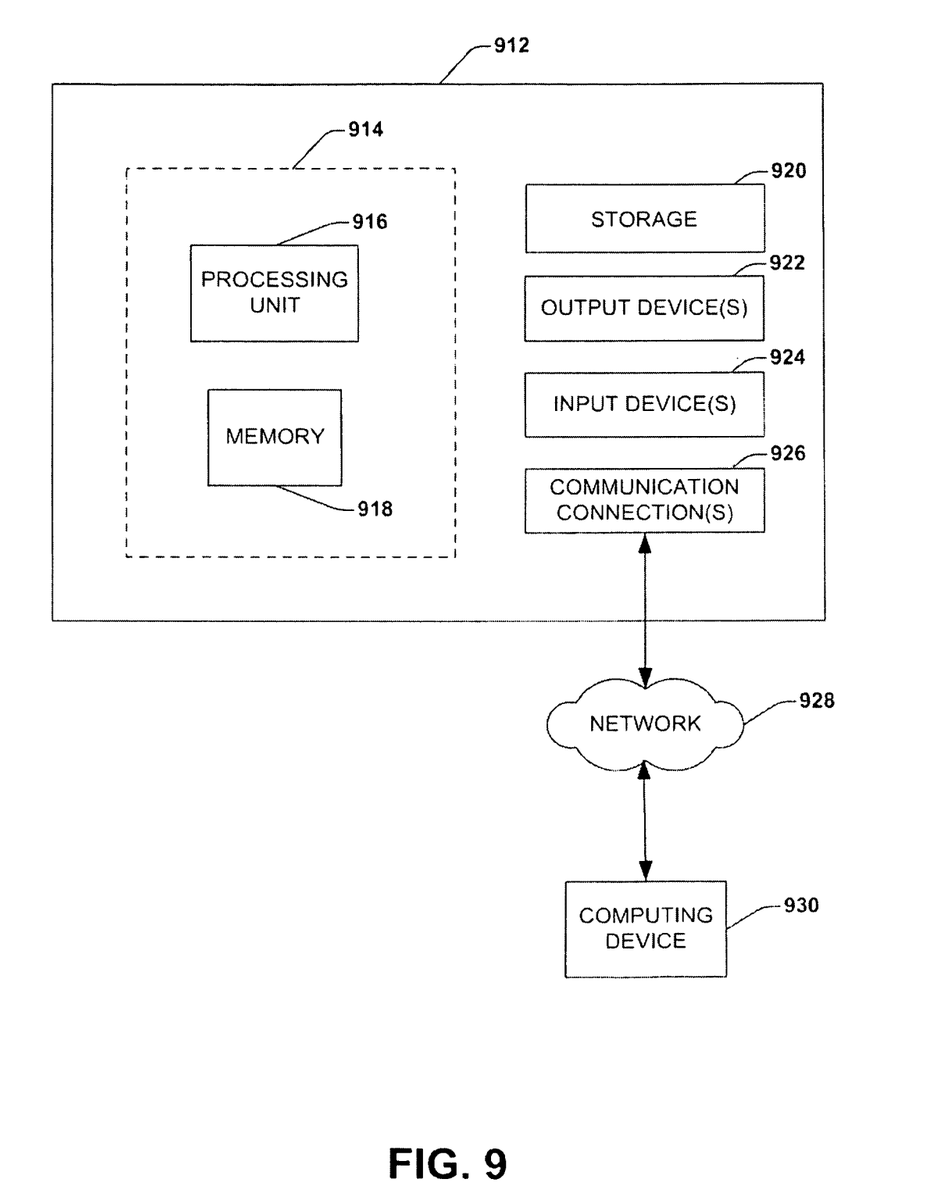
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. An acoustic echo cancellation system configured to reduce acoustic echo in an audio signal generated by a microphone, the acoustic echo resulting from audio signals that have been spatialized and that are received via two or more audio channels, the acoustic echo cancellation system comprising:
    an acoustic echo cancellation unit comprising:
        a first acoustic echo canceller operably coupled to a first channel of the two or more audio channels and configured to apply a first echo cancellation coefficient to a first audio signal transmitted via the first channel to generate a first echo cancellation factor, the first echo cancellation coefficient determined as a function of a first gain and delay modulation factor used to spatialize the first audio signal, the first gain and delay modulation factor substantially constant over time; and
        a second acoustic echo canceller operably coupled to a second channel of the two or more audio channels and configured to apply a second echo cancellation coefficient to a second audio signal transmitted via the second channel to generate a second echo cancellation factor, the second echo cancellation coefficient determined as a function of a second gain and delay modulation factor used to spatialize the second audio signal, the second gain and delay modulation factor substantially constant over time, and
    the acoustic echo cancellation unit configured to reduce the acoustic echo in the audio signal generated by the microphone as a function of the first echo cancellation factor and the second echo cancellation factor.

2. The system of claim 1, the first acoustic echo canceller not operably coupled to the second channel.

3. The system of claim 2, the second acoustic echo canceller not operably coupled to the first channel.

4. The system of claim 1, the first acoustic echo canceller configured to determine the first echo cancellation coefficient as a function of at least one of a Kalman filter or a constrained recursive least squares.

5. The system of claim 1, the first acoustic echo canceller configured to determine the first echo cancellation coefficient as a function of a modeled room impulse response (RIR).

6. The system of claim 1, the first acoustic echo canceller configured to determine the first echo cancellation coefficient as a function of a statistical parameter estimation method.

7. The system of claim 5, comprising:
    an FIR filter configured to create the modeled RIR.

8. A method for reducing acoustic echo in an audio signal generated by a microphone, the acoustic echo resulting from audio signals that have been spatialized and that are received via two or more audio channels echo, comprising:
    applying a first echo cancellation coefficient to a first audio signal transmitted via a first channel of the two or more audio channels to generate a first echo cancellation factor, the first echo cancellation coefficient determined as a function of a first gain and delay modulation factor used to spatialize the first audio signal, the first gain and delay modulation factor substantially constant over time;
    applying a second echo cancellation coefficient to a second audio signal transmitted via a second channel of the two or more audio channels to generate a second echo cancellation factor, the second echo cancellation coefficient determined as a function of a second gain and delay modulation factor used to spatialize the second audio signal, the second gain and delay modulation factor substantially constant over time; and
    reducing the acoustic echo in the audio signal generated by the microphone as a function of the first echo cancellation factor and the second echo cancellation factor.

9. The method of claim 8, comprising:
    updating the first echo cancellation coefficient when the first channel is inactive.

10. The method of claim 8, comprising:
    determining the first echo cancellation coefficient as a function of at least one of a Kalman filter or a constrained recursive least-squares.

11. The method of claim 8, comprising:
    determining the first echo cancellation coefficient as a function of a modeled room impulse response (RIR).

12. The method of claim 8, comprising:
    converting the first audio signal from a time domain to a frequency domain prior to applying the first echo cancellation coefficient to the first audio signal.

13. The method of claim 8, comprising:
    determining the first echo cancellation coefficient as a function of a statistical parameter estimation method.

14. A computer-readable medium comprising processor-executable instructions that when executed perform a method for reducing acoustic echo in an audio signal generated by a microphone, the acoustic echo resulting from audio signals that have been spatialized and that are received via two or more audio channels, comprising:
applying a first echo cancellation coefficient to a first audio signal transmitted via a first channel of the two or more audio channels to generate a first echo cancellation factor, the first echo cancellation coefficient determined as a function of a first gain and delay modulation factor used to spatialize the first audio signal, the first gain and delay modulation factor substantially constant over time;
applying a second echo cancellation coefficient to a second audio signal transmitted via a second channel of the two or more audio channels to generate a second echo cancellation factor, the second echo cancellation coefficient determined as a function of a second gain and delay modulation factor used to spatialize the second audio signal, the second gain and delay modulation factor substantially constant over time; and
reducing the acoustic echo in the audio signal generated by the microphone as a function of the first echo cancellation factor and the second echo cancellation factor.

15. The computer-readable medium of claim 14, the method comprising:
updating the first echo cancellation coefficient when the first channel is inactive.

16. The computer-readable medium of claim 1, the method comprising:
determining the first echo cancellation coefficient as a function of at least one of a Kalman filter or a constrained recursive least-squares.

17. The computer-readable medium of claim 14, the method comprising:
determining the first echo cancellation coefficient as a function of a modeled room impulse response (RIR).

18. The computer-readable medium of claim 14, the first echo cancellation coefficient merely applied to the first audio signal and the second echo cancellation coefficient merely applied to the second audio signal.

19. The computer-readable medium of claim 14, the method comprising:
determining the first echo cancellation coefficient as a function of a statistical parameter estimation method.

20. The computer-readable medium of claim 17, the method comprising:
creating the RIR using an FIR filter.

* * * * *